United States Patent [19]

Morris

[11] Patent Number: 4,538,146
[45] Date of Patent: Aug. 27, 1985

[54] INTEGRATED CIRCUIT OUTPUT PINS USED FOR INPUT SIGNALS

[75] Inventor: Dennis E. Morris, Saratoga, Calif.

[73] Assignee: National Semiconductor Corporation, Santa Clara, Calif.

[21] Appl. No.: 419,265

[22] Filed: Sep. 17, 1982

[51] Int. Cl.³ ............................ G09G 3/00; G09G 3/32
[52] U.S. Cl. .................................... 340/814; 340/802; 340/711; 340/365 S; 340/782
[58] Field of Search ................... 340/814, 711, 365 C, 340/365 S, 365 E, 365 R, 811, 802, 782

[56] References Cited

U.S. PATENT DOCUMENTS

| 3,918,051 | 11/1975 | Bernin et al. | 340/365 E |
| 3,990,070 | 11/1976 | Spence | 340/711 |
| 4,188,626 | 2/1980 | Frantz et al. | 340/711 |

Primary Examiner—Marshall M. Curtis
Attorney, Agent, or Firm—Michael J. Pollock; Paul J. Winters; Gail W. Woodward

[57] ABSTRACT

A circuit that monitors the LED driver output pins on an integrated circuit for quiescent moments and then uses those output pins, only during these moments, to strobe keys on a keyboard for input signals.

4 Claims, 2 Drawing Figures

4,538,146

INTEGRATED CIRCUIT OUTPUT PINS USED FOR INPUT SIGNALS

BACKGROUND OF THE INVENTION

As integrated circuit packages grow smaller, it becomes more and more difficult to find sufficient physical room to mount the required number of input and output pins. Two very common functions that require a large number of pins are outputs to drive displays and inputs from keyboards. A typical prior art design might have sixteen pins, each of which is dedicated to a particular display element such as a light emitting diode. Another group of dedicated pins serves to input signals from a keyboard. My invention contemplates a way to combine these two functions on one set of shared pins.

SUMMARY OF THE INVENTION

Basically, the invention takes advantage of the fact that there can be certain times when the display driving output pins are quiescent. During these intervals, the pins may be used to conduct a strobe current to the keys on the keyboard to test for an input signal. This approach is particularly compatible with displays that use light emitting diodes (LED's). LED's are often driven by an alternating current source and are off for a short, non-perceived, interval when the alternating voltage is crossing through zero. My invention detects this off condition interval and applies a keyboard strobe or interrogation signal, during the interval, making use of the pins that control the LED's. Since the LED's are actually off anyway, no interference with the display is created.

Also described are several ways to multiplex the signal so that a large number of keys can be strobed with a lesser number of LED output pins.

DESCRIPTION OF THE PREFERRED EMBODIMENT

Figure 1:
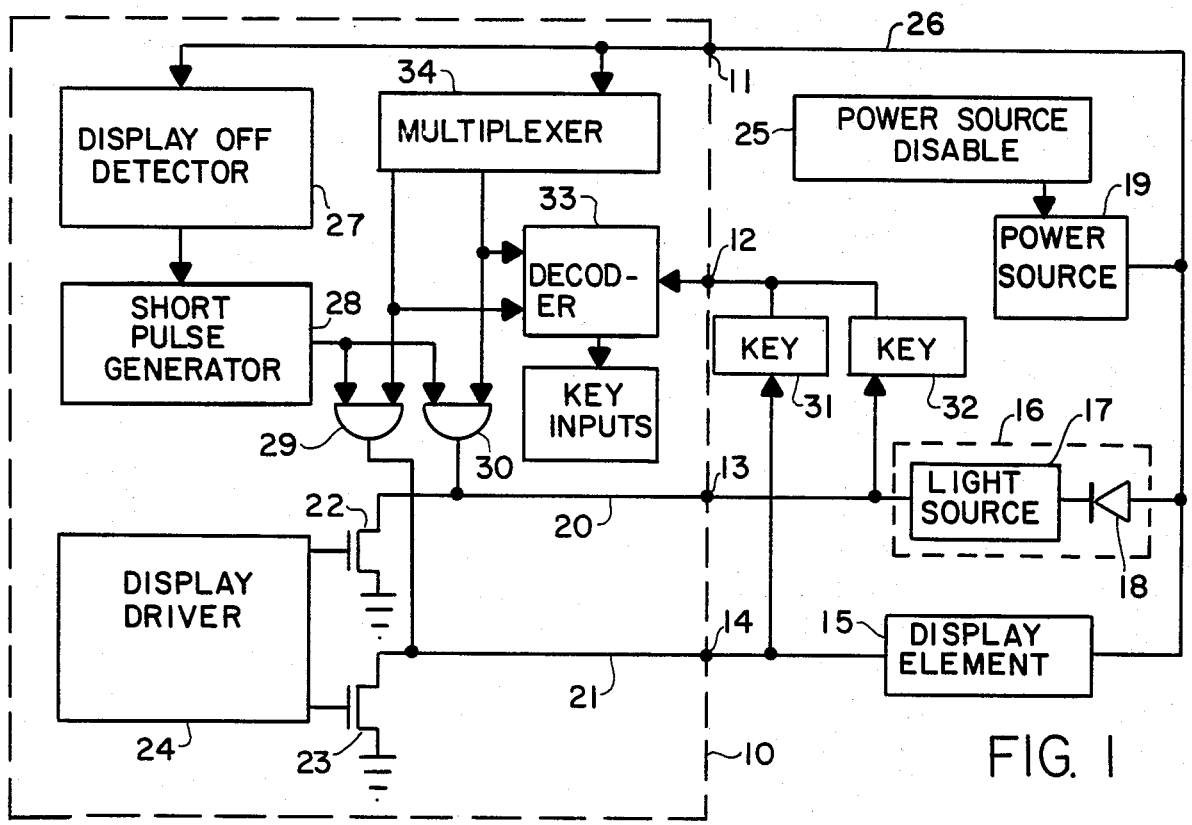
FIG. 1 shows a generalized schematic diagram of my invention with one type of multiplexing.

In FIG. 1, elements within dashed line 10 are generally inside the integrated circuit although some variations from this arrangement may be advantageous in other designs. Only four pins, numbered 11-14, are shown although many more are typical on an integrated circuit. And although a conventional display might normally involve numerous display elements, only two are shown in FIG. 1 for ease of description, numbered 15 and 16. Display element 16 is shown with a dashed line and may include some type of indicating means, such as a light source 17, in conjunction with a suitable rectifier or diode 18. An LED, of course, provides an ideal display element since it inherently both emits light and rectifies. But the invention should not be limited to use only with LED's.

Display elements 15 and 16 are usually activated by an outside source of power 19 which supplies voltage through elements 15 and 16, pins 13 and 14, and conductive paths 20 and 21 to a pair of transistor switches 22 and 23. A display driver 24 operates the display elements in a manner well known to those skilled in the art, activating element 15, for example, by turning on transistor 23 so as to ground path 21 and cause current to flow through element 15.

In order to use pins 13 and 14 for input signals, the present invention turns off the current flow through display elements 15 and 16 for a short interval. By keeping the off interval short enough, there is no noticeable flicker in the display elements. In FIG. 1, a generalized power source disabling means 25 is diagrammed that produces a short off interval. The off interval is detected over a line 26 by a detector 27 which in turn triggers a short pulse from a generator 28. This short pulse of current is coupled to paths 20 and 21 by a pair of AND gates 29 and 30. The short pulse does not flow backwards through elements 15 and 16 because of the rectifier 18 or because of the inherent rectification of an LED used for the display elements. The pulse on path 20 is used to strobe a key 31 and the pulse on path 21 strobes a key 32. If either key has been struck, the strobe pulse is passed through to a decoder 33 which decodes which key it was by comparing the time of the pulse received with the input from a multiplexer 34 that opens gates 29 and 30 at different times in a conventional multiplexing fashion.

It is easy to extrapolate FIG. 1 to a system using, say, sixteen display elements. Multiplexer 34 would sequentially enable sixteen gates connected to the sixteen output pins that control the elements. The multiplexer could scan all sixteen during one interval or open as little as one gate during each interval as desired. However, even more keys could be strobed by using each conductive path to strobe several keys as in FIG. 2.

Figure 2:
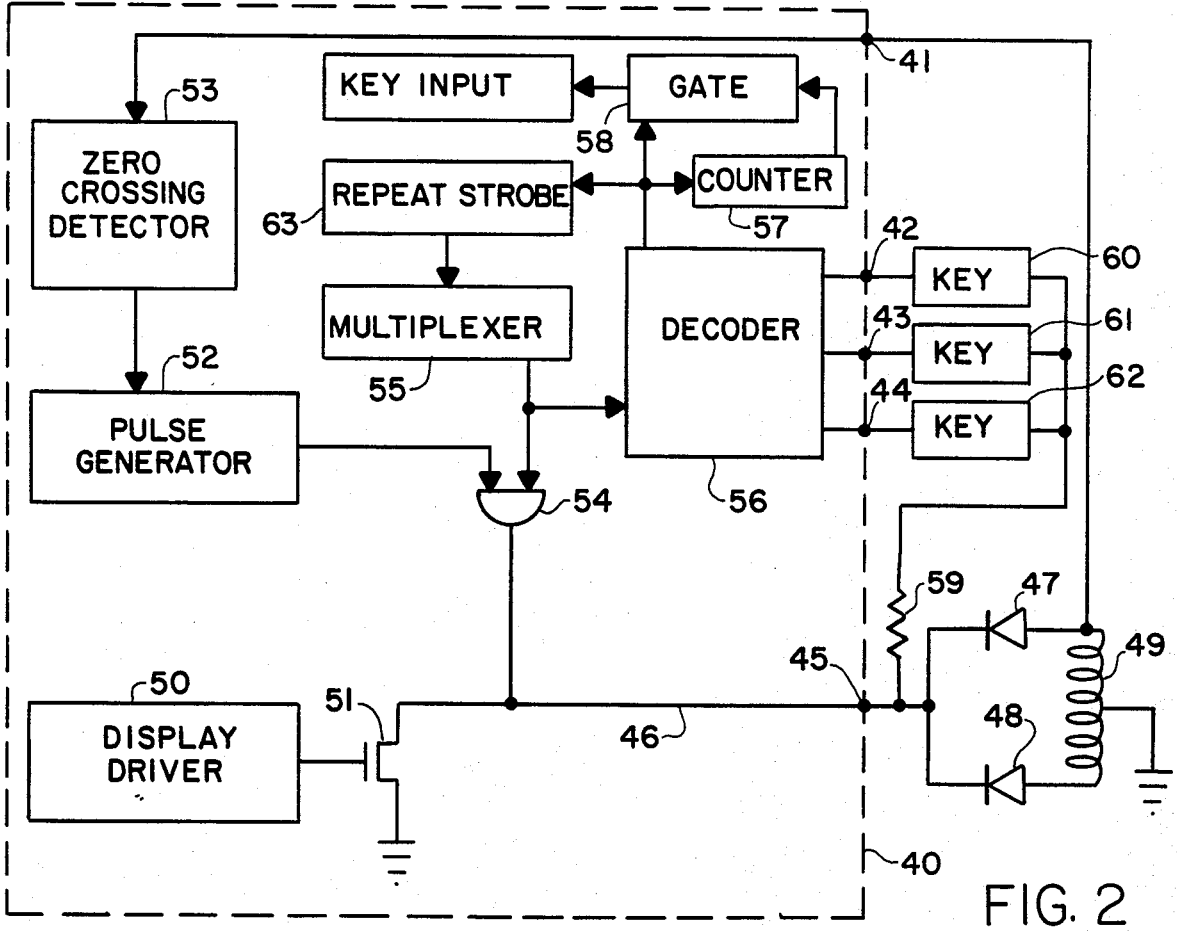
FIG. 2 shows a schematic diagram of another multiplexing, or key discriminating circuit, as used with an alternating current powered LED display.

FIG. 2 shows an integrated circuit 40 with pins 41-45 and one of the conductive paths 46. A pair of LED's 47 and 48 are powered by an alternating current source which is represented by a coil 49 in the drawing. Each LED activates on alternate half cycles of the 60 hertz power source, in a conventional manner, provided, of course, that a ground path is provided by a driver 50, switch 51, and path 46. Driver 50 is coordinated with the power source so as to activate the correct LED, 47 or 48, by operating switch 51 at the correct times. It is clear that when the power source voltage is crossing through zero neither LED 47 or 48 can be activated. So there is provided a natural inherent short interval, 120 times a second, during which path 46 may carry a key strobe pulse. The pulse is produced by generator 52, in response to the output of a zero crossing detector 53, and conveyed to path 46 by a gate 54. Gate 54 is periodically enabled by a multiplexer 55, as would many other gates connected to more paths not shown in FIG. 2 but described in FIG. 1. When gate 54 is enabled, in its turn, the pulse reaches path 46 and is presented through an isolating resistor 59 to three keys 60, 61, and 62. Each key is separately connected to a decoder 56 which discriminates which keys have passed on strobe pulses from path 46. Decoder 56 can also determine that it was the keys connected to path 46 that activated because a time signal from multiplexer 55 is coincident with the reception of the strobe pulse. One can thus also multiplex in time and connect three more keys to pins 42, 43, and 44 and to another output path as in FIG. 1. If, for example, one multiplexes in time over sixteen output pins and also connects three keys to each path, a total of forty-eight different keys may be serviced. Accordingly, a large number of keys, or other input signal sources, may be monitored by adding only a few pins to the integrated circuit.

As a precaution against transient input signals resulting from key bounce or the like, circuit 40 also includes a gate 58 and counter 57 along with a means 63 that responds to an ouput on decoder 56 by causing multiplexer to temporarily stop sequencing and instead repeat the previous gating signal. Counter 57 counts the first output from decoder 56 and if this is followed by another output on the repeat strobe, passes this second count through gate 58 to be recognized as a valid key input by the integrated circuit.

I claim:

1. A circuit for permitting connections to an integrated circuit to be used to both drive display elements and provide strobe signal to a keyboard comprising:

a plurality of pins for coupling the integrated circuitt to the display elements and to the keyboard;

detection means coupled to all of said plurality of pins and responsive to signals appearing thereon for determining when the pins are not being used to supply signals to the display elements are in response thereto generating a first signal;

pulse generator means coupled to the detection means for generating pulses in response to the first signal;

a plurality of AND gates each having a first input terminal connected to receive the pulses from the pulse generator and each having an output terminal connected to a different one of the plurality of pins for supplying strobe signals thereto; and multiplexer means connected to receive signals from all of the pins and connected to supply signals to a different second input terminal of each of the AND gates for controlling which of the AND gates passes the strobe signal to one of the pins and the keyboard.

2. Apparatus as in claim 1 further comprising a plurality of rectification means, each serially connected with a different one of the display elements for preventing the strobe signal from activating any display element.

3. Apparatus as in claim 2 further comprising:

an additional pin on the integrated circuit connected to receive signals from the keyboard; and decoder means coupled to the additional pin and to the second input terminal of each of the AND gates for detecting which key in the keyboard was activated.

4. The circuit of claim 3 in which the display elements comprises light-emitting diodes powered by an alternating current supply and the detection means comprises a zero voltage crossing detector connected to the alternating current supply to detect when the supply falls below the minimum needed to cause current to flow through the diodes.

* * * * *